United States Patent [19]

Alas et al.

[11] Patent Number: 4,714,148
[45] Date of Patent: Dec. 22, 1987

[54] PROGRESSIVELY ACTING FRICTION DISK SUITABLE FOR AUTOMOBILE VEHICLE CLUTCHES

[75] Inventors: Jacques Alas, Eaubonne; Michel Bacher, Domont, both of France

[73] Assignee: Valeo, Paris, France

[21] Appl. No.: 739,366

[22] Filed: May 30, 1985

[30] Foreign Application Priority Data

May 30, 1984 [FR] France .................. 84 08525

[51] Int. Cl.⁴ .................. F16D 13/64; F16D 69/04
[52] U.S. Cl. .................. 192/107 C; 192/52
[58] Field of Search .................. 192/52, 107 C, 109 B

[56] References Cited

U.S. PATENT DOCUMENTS

| | | | |
|---|---|---|---|
| 1,479,974 | 1/1924 | Sturt et al. | 192/107 C |
| 1,659,289 | 2/1928 | Gamble | 192/52 X |
| 2,256,698 | 9/1941 | Wolfram | 192/107 C |
| 2,256,709 | 9/1941 | Gayer | 192/107 C |
| 2,308,604 | 1/1943 | Goodwin | 192/107 C |
| 2,566,394 | 9/1951 | Zeidler | 192/107 C |
| 2,658,598 | 11/1953 | Thelander | 192/107 C |
| 3,587,803 | 6/1971 | Sugiura et al. | 192/107 C |
| 3,921,777 | 11/1975 | Rist | 192/107 C |
| 4,516,672 | 5/1985 | Caray | 192/107 C |

FOREIGN PATENT DOCUMENTS

| | | |
|---|---|---|
| 2751043 | 5/1978 | Fed. Rep. of Germany ... 192/107 C |
| 1084371 | 1/1955 | France . |
| 2094693 | 2/1972 | France . |
| 2370893 | 6/1978 | France . |
| 1591949 | 7/1981 | United Kingdom . |

*Primary Examiner*—Leslie Braun
*Assistant Examiner*—Richard M. Lorence
*Attorney, Agent, or Firm*—Charles E. Brown; Charles A. Brown

[57] ABSTRACT

A friction disk comprises circumferentially distributed support vanes and two annular friction facing members at its periphery, one on each side of the support vanes. Each friction facing member is axially fastened to the support vanes but axially mobile relative to the other friction facing member. Each support vane comprises a sheet metal member which is bent in an inoperative configuration with the friction facing members moved apart from one another. This sheet metal member features a circumferential succession of bends delimiting a circumferential succession of bearing surfaces alternately for one of the friction facing members and for the other. The friction facing members comprise bearing areas which cooperate with these bearing surfaces and recesses between these bearing areas axially recessed relative to the bearing areas. In this way the part of the sheet metal member constituting each of the support vanes located between the bearing surface for one of the friction facing members and the bearing surface for the other such member is caused to bend in the opposite direction when the friction facing members are moved towards one another.

14 Claims, 10 Drawing Figures

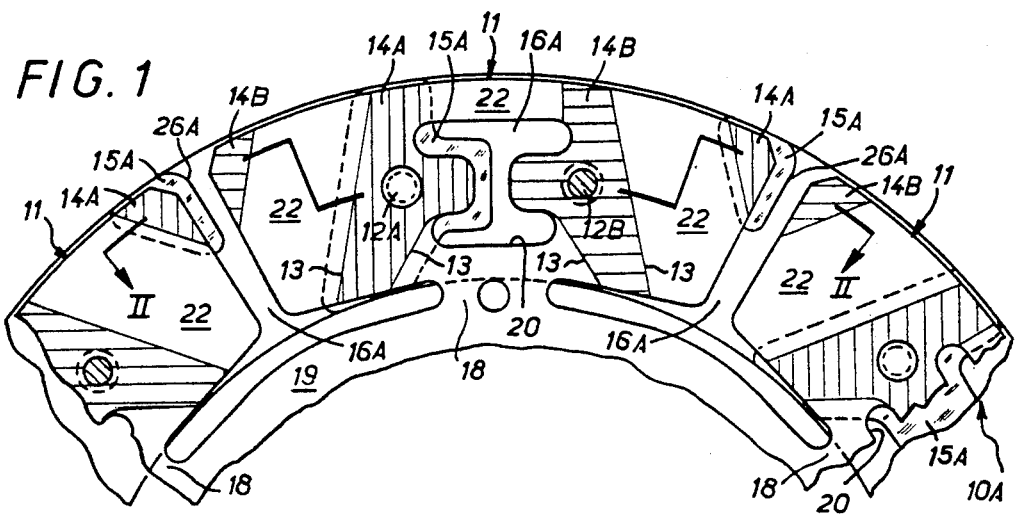
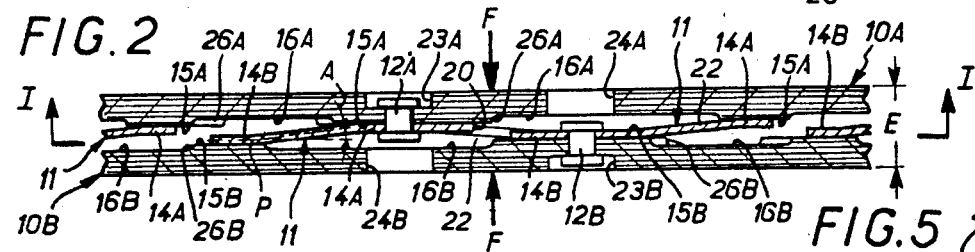
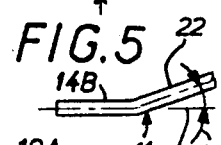
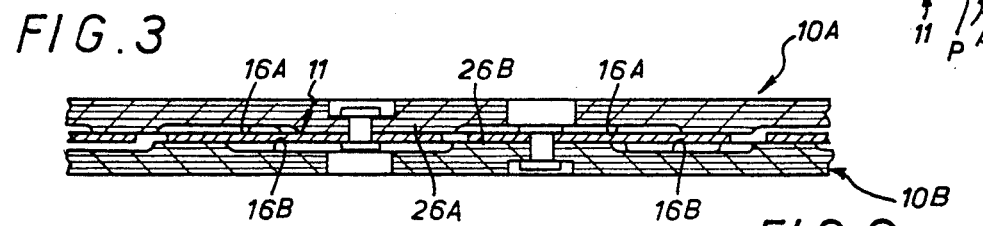
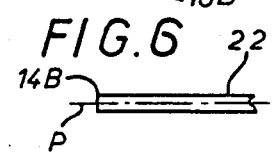
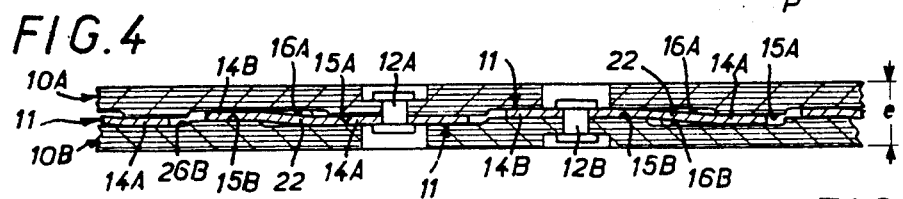
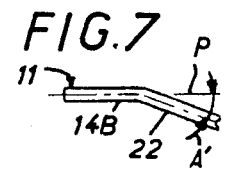

PROGRESSIVELY ACTING FRICTION DISK SUITABLE FOR AUTOMOBILE VEHICLE CLUTCHES

BACKGROUND OF THE INVENTION

1. Field of the invention

The present invention is generally concerned with friction disks of the type used in clutches, for automobile vehicles in particular.

2. Description of the prior art

As is known, a friction disk of this kind comprises, at its periphery, two annular friction facing members disposed on respective sides of support vanes which are appropriately distributed in the circumferential direction and each of which is coupled axially to each of said support vanes, whether such support vanes are in one piece with a flange carried by a hub or each is individually attached to a flange of this kind.

The present invention is more particularly directed to those friction disks of this kind which, adapted to provide for progressive engagement of the clutches of which they form part, are commonly described as progressively acting.

Such progressively acting friction disks are described, for example, in French Pat. No. 2,094,693 filed Jan. 10, 1970 under the No. 70 24132 and in U.S. Pat. No. 2,256,698.

In both cases the required progressive action is due to the fact that, whilst being axially coupled to the support vanes which carry them, the friction facing members are axially movable relative to one another: in the inoperative state, that is to say in the absence of any load, they are axially separated from one another and under load they move towards one another, by virtue of elastic deformation of said support vanes.

In French Pat. No. 2,094,693, each of the support vanes is formed by a simple sheet metal member and to achieve the required progressive action this member is bent, that is to say when it is inoperative, with the friction facing members moved apart from one another, it features a circumferential succession of bends delimiting on it a circumferential series of bearing surfaces for one of said friction facing members alternating with bearing surfaces for the other of the latter.

In this case, the support vanes are always operative in compression, the friction facing members urging them towards a substantially plane configuration when, under load, they are caused to move towards one another.

In U.S. Pat. No. 2,256,698 each of the support vanes is also formed from a simple sheet metal member but, when inoperative, this is substantially plane and in order to achieve the required progressive action, the friction facing members feature recesses between the bearing areas adapted for bearing cooperation with said support vanes, axially recessed relative to said bearing areas.

In this case, the support vanes are always operative in traction, the friction facing members urging them towards a wave-like overall configuration when, under load, they are caused to move towards one another.

These arrangements have given and continue to give satisfaction.

However, for a given overall dimension in the axial direction, the progressiveness of engagement that they provide for is necessarily limited.

A general object of the present invention is an arrangement which, by combining the previous two arrangements, advantageously provides for increasing this progressiveness of engagement and also confers other advantages.

SUMMARY OF THE INVENTION

The present invention consists in a friction disk comprising circumferentially distributed support vanes and two annular friction facing members at its periphery, disposed one on each side of said support vanes and each axially fastened to said support vanes but axially mobile relative to one another, wherein each of said support vanes comprises a sheet metal member which is bent in an inoperative configuration with said friction facing members moved away from one another, and which features a circumferential succession of curves delimiting a circumferential succession of bearing surfaces for one of said friction facing members alternating with bearing surfaces for the other of said friction facing members, and wherein said friction facing members comprise bearing areas which cooperate with said bearing surfaces and recesses between said bearing areas axially recessed relative to said bearing areas, whereby the part of said sheet metal member constituting each of said support vanes located between the bearing surface for one of said friction facing members and the bearing surface for the other of said friction facing members is caused to bend in the opposite direction when said friction facing members are moved towards one another.

Apart from the fact that the recesses in the friction facing members thus associated with bent support vanes advantageously result in a lightening of the friction facing members and an improvement in respect of their ventilation, they make possible further axial movement towards one another of said friction facing members after said bent support vanes are returned to a substantially plane configuration, commensurately extending the progressiveness of engagement which these vanes provide for.

Moreover, this progressive engagement is initially due to the work done to compress the support vanes and then to the work done on them in traction; it is thus advantageously stiffened up in the second phase, which is the final phase, under maximum load, the capacity for deformation of the support vanes in traction being less than their capacity for deformation in compression.

Thus there is an advantageous match between the changing load and the changing stiffness of the required progressive engagement.

The effects of inevitable scoring to which the friction facing members are usually subject in service by virtue of flexing of the support vanes between their bearing areas, which are prejudicial to the required progressive engagement, are also advantageously eliminated.

Finally, for a given overall dimension in the axial direction, the arrangement in accordance with the invention also provides for, alternatively to or in combination with an increase in the progressiveness of engagement, retaining capacity for further deformation of the support vanes on termination of the normal axial movement towards one another of the friction facing members, clearance being left for this purpose between the friction facing members and the back of certain at least of the recesses which these members feature, by means of appropriate differences in the depths of these recesses, which advantageously accommodates any buckling of the support vanes and/or differential and/or irregular expansion of one or both of the plates between which the friction facing members are axially clamped in service.

It should be emphasized that normally nothing would incite the man skilled in the art concerned with the progressive engagement of a friction disk to adopt the arrangement in accordance with the invention, firstly because the two arrangements (support vanes which are curved when inoperative and recesses in the friction facing members) that it employs in combination would, to the contrary, appear to him a priori contradictory, and secondly because it is an audacious idea since it leads in service to a change in the direction of bending of the support vanes, there being every reason to fear that, the vanes being made of a specific spring steel, any such change in the direction of bending could give rise to excessive fatigue, prejudicial to their service life.

Surprisingly, experience shows that this is not the case, the service life of the support vanes remaining satisfactory.

Other objects and advantages will appear from the following description of examples of the invention, when considered in connection with the accompanying drawings, and the novel features will be particularly pointed out in the claims.

BRIEF DESCRIPTION OF THE DRAWINGS

FIG. 1 is a partial view in elevation of a friction disk in accordance with the invention in cross-section on the line I—I in FIG. 2.

FIG. 2 is a partial view of this friction disk in circumferential cross-section on the broken line II—II in FIG. 1, the friction disk being free of any axial load.

FIG. 3 is a view analogous to that of FIG. 2, with the friction disk under an intermediate load.

FIG. 4 is a view analogous to that of FIG. 2, with the friction disk under the maximum load.

FIGS. 5, 6 and 7 each show to a larger scale a detail of FIGS. 2, 3 and 4, respectively.

DESCRIPTION OF THE PREFERRED EMBODIMENTS

Figure 8:
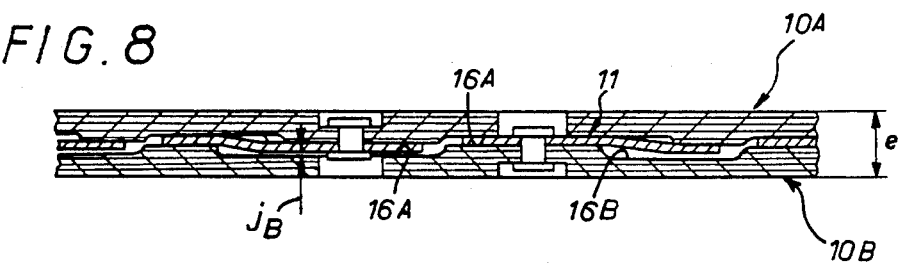
FIGS. 8 and 9 are views analogous to that of FIG. 4 and each concerning a respective alternative embodiment.

As a general rule, and as shown by these figures, the friction disk in accordance with the invention, which is designed to be fitted to a clutch for automobile vehicles, comprises at its periphery two annular friction facing members 10A, 10B which are disposed one on each side of support vanes 11, appropriately distributed in the circumferential direction, and each of which members is axially coupled to each of the support vanes 11, by rivets 12A, 12B, for example and as shown here, whilst being axially movable relative to one another between two extreme positions, an inoperative one in which they are moved apart from one another and an operative position in which, under a maximum load, they are moved close to one another.

In accordance with the invention, and in combination, on the one hand each of the support vanes 11 is formed by a simple sheet metal member which is bent when inoperative, with the friction members 10A, 10B moved apart from one another, said sheet metal member featuring a circumferential succession of bends 13 delimiting in it a circumferential succession of bearing surfaces 14A for the friction facing member 10A alternating with bearing surfaces 14B for the friction facing member 10B, and on the other hand the friction facing members 10A, 10B comprise recesses 16A, 16B which are axially recessed relative to the bearing areas 15A, 15B between these bearing areas 15A, 15B which the friction facing members 10A, 10B feature for cooperation with the bearing surfaces 14A, 14B on the support vanes 11.

In the embodiment shown in FIGS. 1 through 4, the support vanes 11 are of the type described in French Pat. No. 2,370,893 filed Nov. 15, 1976 under the No. 76 34241.

As the support vanes do not of themselves constitute part of the present invention they will not be described in detail here.

It will suffice to indicate that, by virtue of a root 18 of reduced width, they are each in one piece with a common flange 19, that they feature in their median parts an I-shaped cut-out 20, that their bearing areas 14A, 14B are plane, that they comprise two bearing surfaces 14A and two bearing surfaces 14B, that the end bearing surfaces 14A, 14B extend obliquely over part only of their surface, from their outside periphery, whereas the intermediate bearing surfaces 14A, 14B extend from their outside periphery to their inside periphery, each on a respective side of the cut-out 20, that between these bearing surfaces the bends 13 which delimit them also delimit between them oblique linking sections 22 and that, in the intermediate bearing surfaces 14A, 14B their are respectively located, on the one hand, on a first side of the cut-out 20, a rivet 12A for fastening on the friction facing member 10A and, on the other hand, on the other side of said cut-out 20, a rivet 12B for fastening on the friction facing member 10B.

In FIG. 1, to make the diagram clearer, the bend lines 13 are schematically represented in thinner lines, the bearing surfaces 14A have been shown by vertical shading lines and the bearing surfaces 14B have been shown by horizontal shading lines.

In the manner known per se, the rivets 12A, 12B are located in recesses 23A, 23B in the friction facing members 10A, 10B.

Furthermore, and in a manner also known per se, facing each rivet 12A the friction facing member 10B comprises an opening 24B and facing each rivet 12B the friction facing member 10A comprises an opening 24A.

In the embodiment shown, the contour of at least some of the bearing areas 14A, 14B of the friction facing members 10A, 10B and in practice, as shown here, the contour of each of these bearing areas, is substantially the same shape as that of the corresponding bearing surfaces 14A, 14B of the support vanes 11.

In other words, the contour of the bearing areas 15A, 15B is a larger replica of that of the bearing surfaces 14A, 14B in this embodiment.

In practice, the bearing areas 15A, 15B of the friction facing members are formed on bosses 26A, 26B projecting from the back of the recesses 16A, 16B which the friction facing members 10A, 10B feature.

In the embodiment shown in FIGS. 1 through 4, these bearing areas 15A, 15B are substantially plane and the bosses 26A, 26B on which they are formed are isolated, that is to say that, the back of the recesses 16A, 16B of the friction facing members 10A, 10B forming the main surface of the latter, they form isolated "islands" projecting from this main surface.

Also, in this embodiment, the depth of the recesses 16A, 16B in the friction facing members 10A, 10B is the same for all recesses of each of the friction facing members 10A, 10B and is the same on both of the latter.

Finally, in this embodiment, the friction facing members 10A, 10B are in practice identical to one another.

They are simply offset circumferentially relative to one another so that the recesses in one are axially aligned with the bosses of the other and vice versa.

Thus each support vane 11 bears successively, on a first side of its cut-out 20, firstly through its end bearing surface 14B on a boss 26B of the friction facing member 10B, opposite a recess 16A in the friction facing member 10A, and then through its intermediate bearing surface 14A on a boss 26A of the friction facing member 10A, opposite a recess 16B of the friction facing member 10B, and on the other side of said cut-out 20, firstly through its intermediate bearing surface 14B on a boss 26B of the friction facing member 10B, opposite a recess 16A in the friction facing member 10A, and then through its end bearing surface 14A on a boss 26A of the friction facing member 10A, opposite a recess 16B in the friction facing member 10B.

It will be understood that there is sufficient circumferential offset, as measured between the median areas of these bosses, between successive bosses 26A on friction facing member 10A and 26B on friction facing member 10B for the support vanes 11 to be effectively able to flex freely in either direction, given the corresponding offset between the edges of these bosses, as will emerge hereinafter, and so that appropriate bearing support is nevertheless provided to the support vanes 11 with regard to their circumferential development.

In the inoperative state, that is to say in the absence of any load, and as shown in FIG. 2, the support vanes 11 of the friction facing members 10A, 10B are bent, as explained hereinabove. Said friction facing members 10A, 10B are moved apart from one another and the friction disk has a relatively large overall axial thickness E.

When the clutch of which it forms part is engaged and an axial load is applied to the friction disk, as shown by the arrows F in FIG. 2, the sheet metal member constituting each support vane 11 is firstly loaded in compression between a bearing surface 14A on the friction facing member 10A and the adjacent bearing surface 14B on the friction facing member 10B, flexing on a specific side of the median plane of the member.

The axial thickness of the friction disk diminishes, the friction facing members 10A, 10B moving towards one another with their support vanes 11 being progressively flattened.

For a given load on the friction facing members 10A, 10B the support vanes 11 are substantially plane (FIG. 3).

However, by virtue of the recesses 16A, 16B which the friction facing members 10A, 10B feature between their bearing areas 15A, 15B, the relative movement towards one another of the friction facing members 10A, 10B may continue, the sheet metal member constituting each support vane 11 then being subject to a change in its direction of bending.

From this time, the sheet metal member constituting each support vane 11 is loaded in traction, rather than in compression.

The change in the direction of bending to which it is subject is evident in FIG. 4, which corresponds to the termination of axial compression of the friction disk.

The friction disk then has a relatively small axial thickness e.

The difference E−e consistutes a measure of its progressive action.

To better illustrate the change in the direction of bending of the sheet metal member constituting each support vane 11 which is a characteristic of the invention, there is indicated in FIGS. 5, 6 and 7 the original median plane P of a sheet metal member of this kind, one only of the bearing surfaces 14B of the latter being shown for this purpose.

In the inoperative state (FIG. 5) the oblique section 22 which follows on from this bearing surface 14B is at a specific angle A to the latter in a first direction.

For an intermediate load (FIG. 6) it is aligned with the bearing surface 14B.

At full or maximum load (FIG. 7), the section 22 is at a specific angle A' to the bearing surface 14B, in the opposite direction to the angle A.

Thus in accordance with the invention the sheet metal member constituting each support vane 11 is subject to a change in its direction of bending when the friction facing members are brought towards one another.

In the alternative embodiment shown in FIG. 8, the depth of recesses 16B in the friction facing member 10B, which is the same for all recesses 16B of the latter, as previously, is greater than the depth of the recesses 16A in the friction facing member 10A, which is the same for all recesses 16A of the latter.

Thus in this embodiment, at the end of axial compression of the friction disk there is left a clearance $j_B$ between the bottom of the recesses 16B of the friction facing member 10B and the corresponding bearing surfaces 14A of the support vanes 11, which advantageously leaves capacity for possible supplementary deformation of the latter, positive axial bearing engagement between the friction facing members 10A, 10B occurring only in line with the recesses 16B of the friction facing member 10A.

An opposite arrangement is naturally possible.

However, in all cases, the friction facing members 10A, 10B are then no longer identical to one another.

Figure 9:
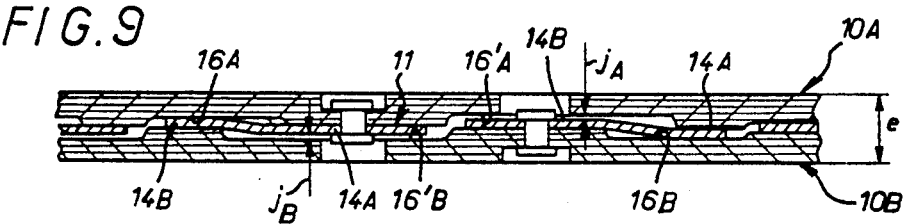

In the embodiment shown in FIG. 9, at least one of the friction facing members 10A, 10B and in practice each of the latter features alternating recesses 16A-16'A, 16B-16'B of different depths so that, for the same purpose as previously, at the end of axial compression of the friction disk there is left a clearance $j_A$, $j_B$ between the intermediate bearing surfaces 14A, 14B of the support vanes 11 and the back of the corresponding recesses 16A, 16B in the friction facing members 10A, 10B, positive axial bearing engagement between the friction facing member 10A, 10B occuring only in line with the end bearing surfaces 14A, 14B of the support vanes 11.

However, in this case, the friction facing member 10A, 10B may again be identical to one another.

In practice, the depth of the recesses 16'B in the friction facing member 10B is equal to that of the recesses 16'A of the friction facing member 10A and greater than that of the associated recesses 16B, which is the same as that of the corresponding recesses 16A.

Figure 10:
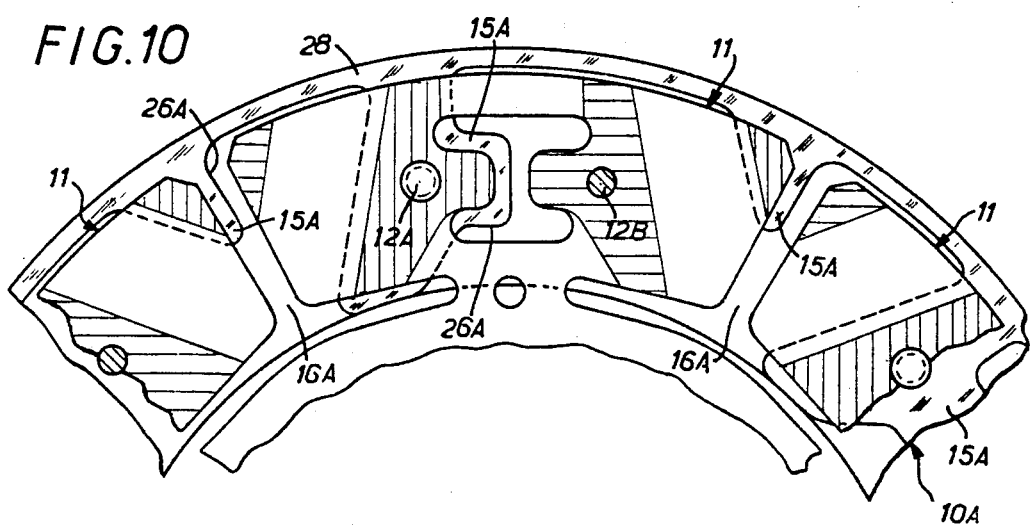
FIG. 10 is a view analogous to that of FIG. 1 and concerns a further embodiment.

In the embodiment shown in FIG. 10, an annular ring 28 is provided at one at least of the peripheries of the friction facing members 16A, 16B, in line with the bosses 26A, 26B on which are formed the bearing areas 15A, 15B.

In practice, in the embodiment shown in FIG. 10, in which the friction facing member 10A is visible, an annular ring 28 of this kind is provided only at the outside periphery of a friction facing member of this kind, that is to say the periphery with the largest diameter.

Also, in this embodiment, the bosses 26A of the friction facing member 10A are linked continuously to the ring 28 to which the latter comprises.

Be this as it may, a ring 28 of this kind increases the rigidity of the friction facing member concerned.

It will be understood that various changes in the details, materials and arrangements of parts which have been herein described and illustrated in order to explain the nature of the invention may be made by those skilled in the art within the principle and scope of the invention as expressed in the appended claims.

In particular, the friction facing member bearing areas are not necessarily plane.

They could on the contrary be more or less.

Also, the contour of the friction facing member bearing areas is not necessary analogous to that of the bearing surfaces of their support vanes.

To the contrary, these could differ.

For example, the friction facing member bearing areas could be subdivided into separate islands more or less regularly distributed in line with the bearing areas of the support vanes and/or these bearing areas could be linked in pairs by bridges level with the bosses which carry them.

In all cases, there is not necessarily positive axial bearing engagement between the friction facing members on completion of engagement, the stiffness of the vanes 11 possibly being of itself sufficient to provide such engagement.

In particular, in the embodiment of FIG. 9, there may also be a clearance $j_4$ between the vanes 11 and the back of the recesses 16A of the friction facing member 10A on completion of such engagement.

Moreover, the scope of the invention is not limited to the support vanes specifically described and shown, but on the contrary covers all possible configurations of theses support vanes.

There is claimed:

1. Friction disk comprising circumferentially distributed support vanes and two annular friction facing members at its periphery, said friction facing members being disposed one on each side of said support vanes and each friction facing member being axially fastened to said support vanes but axially mobile relative to one another, each of said support vanes including a bent sheet metal member having a bent disengaged configuration in which said friction facing members are relatively remote from one another and an oppositely bent engaged configuration in which said friction facing members are close together, and said support vanes featuring a circumferential succession of bends delimiting a circumferential succession of bearing surfaces for one of said friction facing members alternating with bearing surfaces for the other of said friction facing members, and said friction facing members having bearing areas which cooperate with said bearing surfaces and recesses between said bearing areas axially recessed relative to said bearing areas, a part of said sheet metal member constituting each of said support vanes located between the bearing surface for one of said friction facing members and the bearing surface for the other of said friction facing members being flexed when said friction facing members are moved towards one another, whereby said part of said sheet metal member has a positive slope for one of the engaged or disengaged configurations of the corresponding support vane and a negative slope for the other of the engaged or disengaged configuration of the corresponding support vane after passing through a partially engaged configuration where each vane is substantially flat and has substantially no slope.

2. Friction disk according to claim 1, wherein said recesses in one of said friction facing members are deeper than said recesses in the other of said friction facing members.

3. Friction disk according to claim 1, wherein alternate recesses in each of said friction facing members are of different depth.

4. Friction disk according to claim 1, wherein at least some of said bearing areas have a contour which is substantially the same shape as the contour of the corresponding bearing surface.

5. Friction disk according to claim 1, further including bosses projecting from the bottoms of said recesses and wherein said bearing areas of said friction facing members are formed on said bosses.

6. Friction disk according to claim 1 wherein said bearing areas of said friction facing members are planar.

7. A friction disk according to claim 1, wherein said support vanes have a relatively low stiffness initial spring rate and a relative high stiffness final spring rate when under maximum engagement load.

8. Friction disk comprising circumferentially distributed support vanes and two annular friction facing members at its periphery, said friction facing members being disposed one on each side of said support vanes and each friction facing member being axially fastened to said support vanes but axially mobile relative to one another, each of said support vanes including a bent sheet metal member having a bent disengaged configuration with said friction facing members being spaced from one another and an engaged configuration with said friction facing members close together, and said support vanes featuring a circumferential succession of bends delimiting a circumferential succession of bearing surfaces for one of said friction facing members alternating with bearing surfaces for the other of said friction facing members, said friction facing members having bearing areas which cooperate with said bearing surfaces and recesses between said bearing areas having bottoms axially recessed relative to said bearing areas, bosses projecting from the bottoms of said recesses, and said bearing areas of said friction facing members being formed on said bosses whereby a part of said sheet metal member constituting each of said support vanes located between the bearing surface for one of said friction facing members and the bearing surface for the other of said friction facing members is caused to bend in an opposite direction from the direction of the bend of each of said support vanes in said disengaged configuration when said friction facing members are moved towards one another from said spaced relation.

9. Friction disk according to claim 8, wherein said bosses are isolated.

10. Friction disk according to claim 8, further comprising an annular ring at at least one periphery of said friction facing members in line with said bosses.

11. Friction disk according to claim 10, wherein at least some of said bosses are continuous with said ring.

12. Friction disk according to claim 10, wherein said ring is disposed at the largest diameter periphery of said friction facing members.

13. Friction disk according to claim 10, wherein said ring is circumferentially continuous.

14. Friction disk comprising circumferentially distributed support vanes and two annular friction facing members at its periphery, said friction facing members being disposed one on each side of said support vanes and each friction facing member being axially fastened to said support vanes but axially mobile relative to one another, each of said support vanes including a bent sheet metal member having a disengaged configuration with said friction facing members being relatively axially remote from one another and an engaged configuration in which said friction facing members are close together, said support vanes featuring a circumferential succession of bends defining a circumferential succession of bearing surfaces for one of said friction facing members alternating with bearing surfaces for the other of said friction facing members; said friction facing members including bearing areas which cooperate with said bearing surfaces, fastening means fixing selective ones of said bearing surfaces to corresponding ones of said bearing areas, first recesses for accommodating portions of said fastening means, and second recesses between said bearing areas axially recessed relative to said bearing areas for receiving said vanes when said friction facing members are close together, said first recesses being separate from said second recesses, a part of said sheet metal member constituting each of said support vanes located between the bearing surface for one of said friction facing members and the bearing surface for the other of said friction facing members being caused to bend in an opposite direction from the direction of the bend of each of said support vanes in said disengaged configuration when said friction facing members are moved towards one another from said axially remote relation.

\* \* \* \* \*